(12) United States Patent
Lin (10) Patent No.: US 9,031,378 B2
(45) Date of Patent: May 12, 2015

(54) METHOD OF MANAGING MULTIPLE WIRELESS VIDEO TRAFFIC AND ELECTRONIC DEVICE THEREOF

(71) Applicant: VIA Technologies, Inc., New Taipei (TW)

(72) Inventor: Hsin-Hung Lin, New Taipei (TW)

(73) Assignee: VIA Technologies, Inc., New Taipei (TW)

(*) Notice: Subject to any disclaimer, the term of this patent is extended or adjusted under 35 U.S.C. 154(b) by 105 days.

(21) Appl. No.: 13/706,620

(22) Filed: Dec. 6, 2012

(65) Prior Publication Data

US 2013/0259444 A1 Oct. 3, 2013

Related U.S. Application Data

(60) Provisional application No. 61/619,862, filed on Apr. 3, 2012.

(51) Int. Cl.
| | |
|---|---|
| *H04N 5/65* | (2006.01) |
| *H04N 5/765* | (2006.01) |
| *H04N 5/783* | (2006.01) |
| *H04N 21/41* | (2011.01) |
| *H04N 21/4143* | (2011.01) |
| *H04N 21/432* | (2011.01) |
| *H04N 21/436* | (2011.01) |
| *H04N 21/4363* | (2011.01) |

(52) U.S. Cl.
CPC .............. *H04N 5/765* (2013.01); *H04N 5/783* (2013.01); *H04N 21/4122* (2013.01); *H04N 21/4143* (2013.01); *H04N 21/4325* (2013.01); *H04N 21/43622* (2013.01); *H04N 21/43637* (2013.01)

(58) Field of Classification Search
None
See application file for complete search history.

(56) References Cited

U.S. PATENT DOCUMENTS

| | | | | |
|---|---|---|---|---|
| 2001/0029611 | A1* | 10/2001 | Sato et al. | 725/58 |
| 2002/0087716 | A1* | 7/2002 | Mustafa | 709/236 |
| 2002/0116520 | A1* | 8/2002 | Hayden | 709/231 |
| 2004/0091104 | A1* | 5/2004 | Kawamura et al. | 380/28 |
| 2005/0135618 | A1* | 6/2005 | Aslam et al. | 380/212 |
| 2007/0091835 | A1* | 4/2007 | Jo et al. | 370/315 |
| 2009/0177810 | A1* | 7/2009 | Kweon et al. | 710/33 |
| 2010/0058400 | A1* | 3/2010 | Nicas et al. | 725/74 |
| 2011/0269437 | A1* | 11/2011 | Marusi et al. | 455/414.1 |

* cited by examiner

*Primary Examiner* — Hung Dang
*Assistant Examiner* — Sunghyoun Park
(74) *Attorney, Agent, or Firm* — McClure, Qualey & Rodack, LLP (57) ABSTRACT

A method and a playback control device are provided. The method, performed by the playback control device, includes: receiving a first request to playback a first data of a first wireless multimedia data type having a first priority; and playing back the first data if no other data of a wireless multimedia data type having a priority higher than the first priority is received.

17 Claims, 9 Drawing Sheets

METHOD OF MANAGING MULTIPLE WIRELESS VIDEO TRAFFIC AND ELECTRONIC DEVICE THEREOF

CROSS REFERENCE TO RELATED APPLICATIONS

This Application claims priority of U.S. Provisional Application No. 61/619,862, filed on 3 Apr. 2012, and the entirety of which is incorporated by reference herein.

BACKGROUND OF THE INVENTION

1. Field of the Invention

The present invention relates to a multimedia system, and in particular relates to a method of managing multiple wireless image data and a playback control device thereof.

2. Description of the Related Art

Over the years, home and corporate applications for transferring video data on a portable electronic device such as a tablet or a smart phone to a remote multimedia system for playback, have increased. Since remote multimedia systems may be equipped with a high-resolution, wide-range display and a better stereo system, viewers can watch the transferred multimedia content on the multimedia system with improved viewing experiences. Various video playback mechanisms and data transmission technologies for remote multimedia playback applications can now be found commercially. However, incorporating all of the different types of video playback mechanisms and data transmission technologies on one single multimedia system remains a challenge for those in the video system field.

BRIEF SUMMARY OF THE INVENTION

A detailed description is given in the following embodiments with reference to the accompanying drawings.

An embodiment of a method performed by a playback control device is disclosed, comprising: receiving a first request to playback a first data of a first wireless multimedia data type having a first priority; and playing back the first data if no other data of a wireless multimedia data type having a priority higher than the first priority is received.

Another embodiment of a playback control device is provided, comprising an RF front end and a controller. The RF front end is configured to receive a first request to playback a first data of a first wireless multimedia data type having a first priority. The controller, coupled to the RF front end, is configured to process the first data for playback on a display device if no other data of a wireless multimedia data type having a priority higher than the first priority is received.

Another embodiment of a method performed by a video client device is disclosed, comprising: transmitting a first request message of a first wireless multimedia data type having a first priority to a playback control device to request playback of a first data; receiving a first grant message from the playback control device to grant playback of the first data if no other data of a wireless multimedia data type having a priority higher than the first priority is received by the playback control device; and transmitting the first data to the playback control device if the first grant message is received by the video client device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
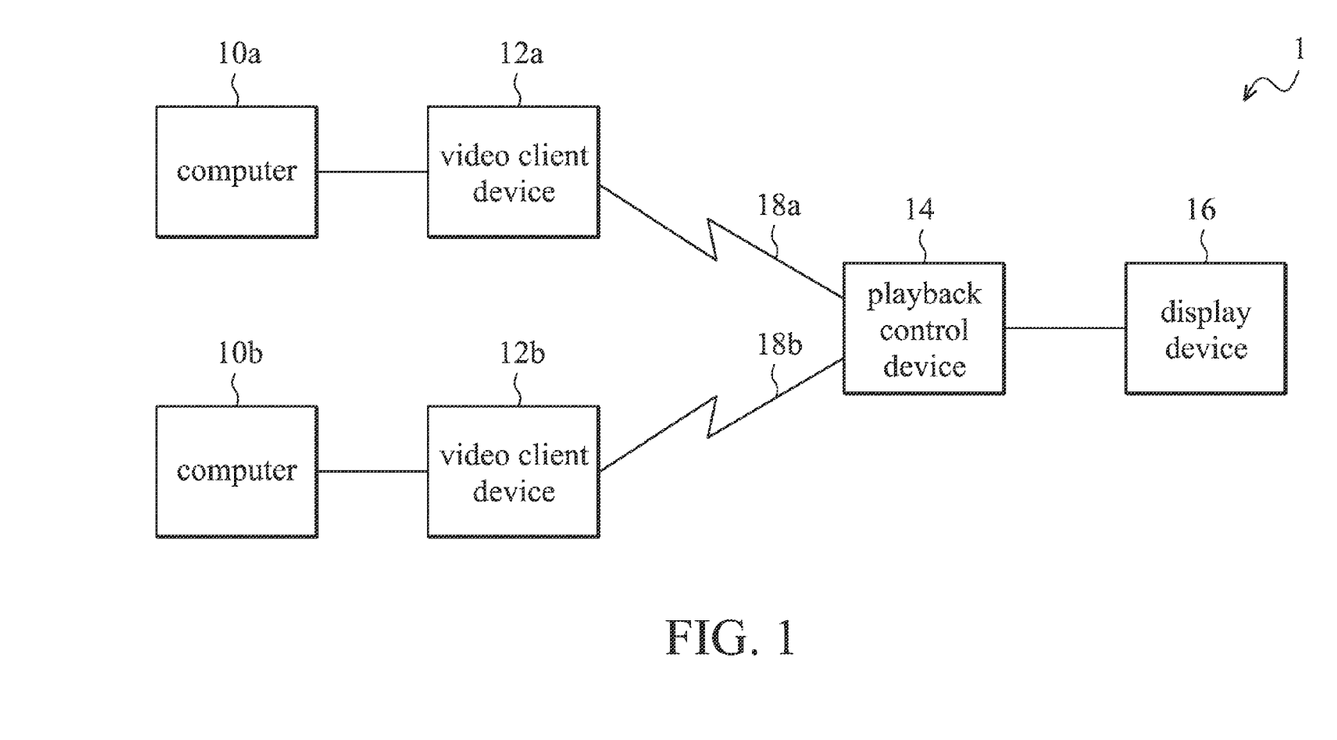
FIG. 1 is a block diagram of a wireless multimedia system 1 according to an embodiment of the invention.

FIG. 1 is a block diagram of a wireless multimedia system 1 according to an embodiment of the invention, comprising computers 10a and 10b, video client devices 12a and 12b, playback control device 14, and display device 16. The computer 10a is coupled to the video client device 12a, and the computer 10b is coupled to the video client device 12b. The video client devices 12a and 12b may communicate with the playback control device 14 by wireless technologies such as a wireless local area network (WLAN) 802.11 a/b/g/n. The playback control device 14 is coupled to the display device 16 by a video interface such as a High-Definition Multimedia Interface (HDMI). The video client devices 12a and 12b may be separated from or incorporated into the computers 10a and 10b respectively, and the playback control device 14 may be separated from or incorporated into the display device 16. Although two computers and two video client devices are used as an example here, the number of computers and video client devices are not limited to two.

The computers 10a and 10b, containing various digital multimedia files such as videos, music, voices, photos, images, or pictures, are any computing electronic device including a laptop, a tablet, a smart phone, a digital camera and a personal computer. The video client devices 12a and 12b are electronic devices requesting for playing back the digital media files, and may be one of the devices including, but not limited to, a PC2TV device, a digital media receiver (DMR) device, a wireless display (WiDi) device, and a WiFi display (WFD) device. Each video client device 12 may employ a dedicated multimedia data type, e.g., a PC2TV device uses a PC2TV data, a DMR device uses a DMR data, a WiDi device uses a WiDi data and a WFD device uses a WFD data.

The PC2TV device may transfer consecutive image frames displayed on a portable device to a remote display device. The transferred image frames are compressed by an image compression scheme to the remote playback control device 14 via the WLAN protocol 802.11 a/b/g/n. The image compression scheme may be Joint Photographic Experts Group (JPEG), Portable Network Graphics (PNG), Graphics Interchange Format (GIF), or any image compression scheme. The DMR is a home entertainment device that may connect to a home network via the WLAN protocol 802.11 a/b/g/n to transfer digital multimedia files from a computer in a home network (not shown) to a remote display device, where the transferred digital media files are decoded, processed and played back on the screen of the display device 16. When the DMR device is used, the user may conduct other software applications on the computer while sending the DMR data to the playback control device 14 without the other software applications being seen on the display device 16. The WiDi device is a wireless display technology that transfers encrypted image frames from a portable device to a remote display device for display. The WFD device is a Wireless Fidelity (WiFi) device directly connected to another WiFi device without the need for an access point, functioning similarly to the WiDi technology.

The playback control device 14 is an electronic device capable of receiving and managing playback requests on wireless communication links 18a and 18b from the multiple video client devices 12a and 12b, and may be a video adaptor, a set-top box, a tablet, a personal computer, a laptop, or a projector controller.

The display device 16 may be a monitor, a television, a laptop, a tablet, or a projector.

When the users would like to view the multimedia content in the computers 10a or 10b on the remote display device 16, the corresponding video client devices 12a and 12b need to send playback requests to the playback control device 14, asking for an access right or a playback right of the display device 16. When more than one playback requests are detected at the playback control device 14, i.e., when the video client devices 12a and 12b both send requests for playing back different multimedia data to the playback control device 14, the playback control device 14 can determine which of the requests should be granted the right of being played back based on the priorities of the different multimedia data types. The priority of different multimedia data types may be default values or later configured on the playback control device 14 by manufacturers, users, or network administrators. In some implementations, the ongoing video playback may be interrupted by another playback request. The priority may be represented by −1, 0, 1, 2 in a decreasing priority order. For example, the playback control device 14 may be configured so that the PC2TV data has the priority of −1, the WiDi data has the priority of 0, the DMR data has the priority of 1, and the WFD data has the priority of 0. When the playback control device 14 receives playback requests for the PC2TV data and the WiDi data concurrently, the playback control device 14 may determine that the PC2TV data has a higher playback priority over the WiDi data, and consequently grant the PC2TV data playback request and reject the WiDi data playback request. In some implementations, when the priorities of the received multiple requests of the multimedia data types are the same, the latter request may replace the former request. While the display device is playing back the WiDi data, the playback control device 14 may detect playback requests for the WFD data concurrently. The playback control device 14 may determine that two data types have equal priority, and consequently suspend or stop the ongoing WiDi data playback and grant the later detected WFD data the playback right. In other implementations, the ongoing video playback may not be interrupted by another playback request. In that case, the playback control device 14 can compare the priorities to determine which of the requested playbacks has the access right to the display device 16 only when no playback is ongoing on the display device 16.

In some implementations, the video client device 12a may transmit a first request message of a first wireless multimedia data type having a first priority to the playback control device 14, and the video client device 12b may also transmit a second request message of a second wireless multimedia data type having a second priority to the playback control device 14 either concurrently or when the playback of the first data is in progress. The video client device 12a may subsequently receive a first grant message for the first request message when the playback control device 14 determines that either no other requests are received or the first priority exceeds the second priority of a concurrent request. In response to the first grant message, the video client device 12a may transmit the first data of the first wireless multimedia data type to the playback control device 14. The video client device 12b may receive a second grant message for the second request message when the playback of the first data is in progress and the first priority is lower than or equal to the second priority. In response to the second grant message, the video client device 12b may transmit the second data of the second wireless multimedia data type to the playback control device 14. The video client device 12b may receive a reject message for the second request message when the playback of the first data is in progress and the first priority is higher than the second priority.

The wireless multimedia system 1 provides an arbitration mechanism to determine which of the requested playbacks has the access to a display device when two or more multimedia playback requests are transmitted to the display device, allowing for various types of multimedia data from portable computer devices to be viewed on a remote wireless display device.

People with ordinary skills in the art may recognize that two or more video client devices 12 may be incorporated in the wireless multimedia system 1.

Figure 2:
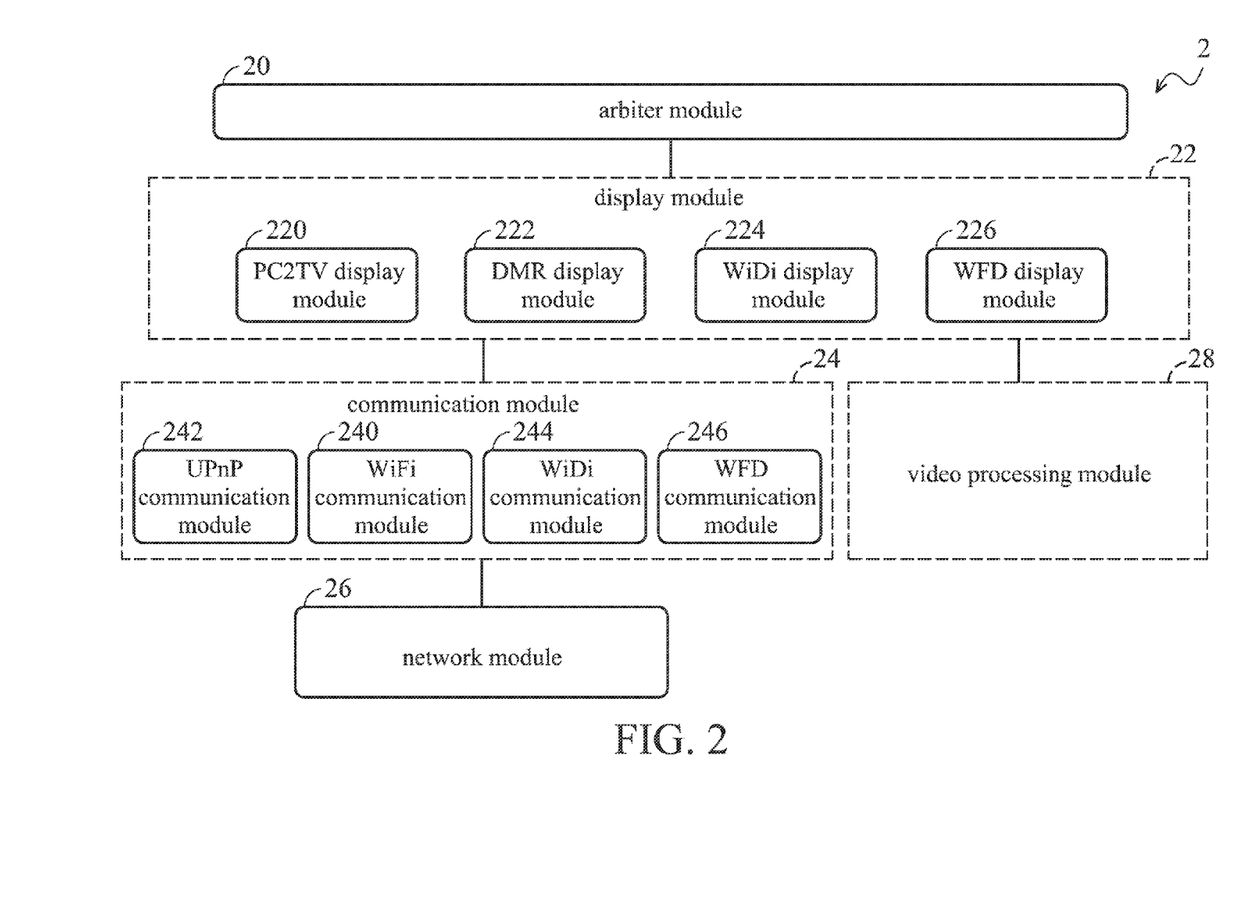
FIG. 2 is a block diagram for a software architecture adopted by the playback control device 14 according to an embodiment of the invention.

FIG. 2 is a block diagram for a software architecture 2 adopted by the playback control device 14 according to an embodiment of the invention. The software architecture 2 contains an arbiter module 20, a display module 22, a communication module 24, a network module 26 and a video processing module 28. The arbiter module 20 is coupled to the display module 22, which in turn is coupled to the communication module 24 and the video processing module 28. The communication module 24 is coupled to the network module 26.

The display module 22 may send requests for playbacks and output multimedia data of one or more different multimedia data types to the arbiter module 20. The arbiter module 20, installed on an operating system of the playback control device 14, may conduct software arbitration on requests to playback multimedia data based on the priorities of the different multimedia data types, determining which multimedia data from the display module 22 is to be played back on the display device 16. The available multimedia data types may include but are not limited to the PC2TV data, the DMR data, the WiDi data, and the WFD data. The priorities of all the available multimedia data types may be configured and stored in the arbiter module 20.

The display module 22 includes a PC2TV display module 220, a DMR display module 222, a WiDi display module 224, and a WFD display module 226, each of which may open a dedicated port for the designated data type, detect presence of the designated multimedia data at the dedicated port, inform the arbiter module 20 the presence of the designated data by a playback request message REQUEST, and conduct various signal processing on the designated multimedia data. The designated multimedia data for the PC2TV display module 220 is the PC2TV data, for the DMR display module 222 is the DMR data, for the WiDi display module is a WiDi data, and for the WFD display module 226 is the WFD data. The PC2TV data, WiDi data, and WFD data are image frames compressed by an image compression scheme such as JPEG. The DMR data are multimedia files that require video decoding and processing before playback. The image processing of the designated multimedia data are performed by the video processing module 28 which may be an nD SDK module or a WPlayer module.

The communication module 24 contains device drivers for various communication protocols including a Wireless Fidelity (WiFi) communication module 240, a Universal Plug and Play (UPnP) communication module 242, a WiDi communication module 244, and a WFD communication module 246. The communication module 24 may, via hardware transceivers, retrieve the communication messages (wireless multimedia data) for the corresponding communication protocol from the wireless communication environment, and process the communication messages to provide the multimedia data to the dedicated port at the display module 22. Specifically, the WiFi communication module 240 may provide the PC2TV data, the UPnP communication module 242 may provide the DMR data, the WiDi communication module 244 may provide the WiDi data, and the WFD communication module 246 may provide the WFD data. In particular, the WiDi communication module 244 and the WFD communication module 246 may control the hardware transceiver to decrypt the retrieved communication messages to provide the WiDi data and the WFD data. The network module 26 may perform signal processing at the network layer level such as directing the retrieved data to the communication module 24.

The software architecture 2 provides an arbitrator module to determine which of the requested playbacks has the access to a display device when two or more requests for multimedia playbacks by the display device are received, allowing for various types of multimedia data from portable computer devices to be viewed on another remote wireless display device.

Figure 3:
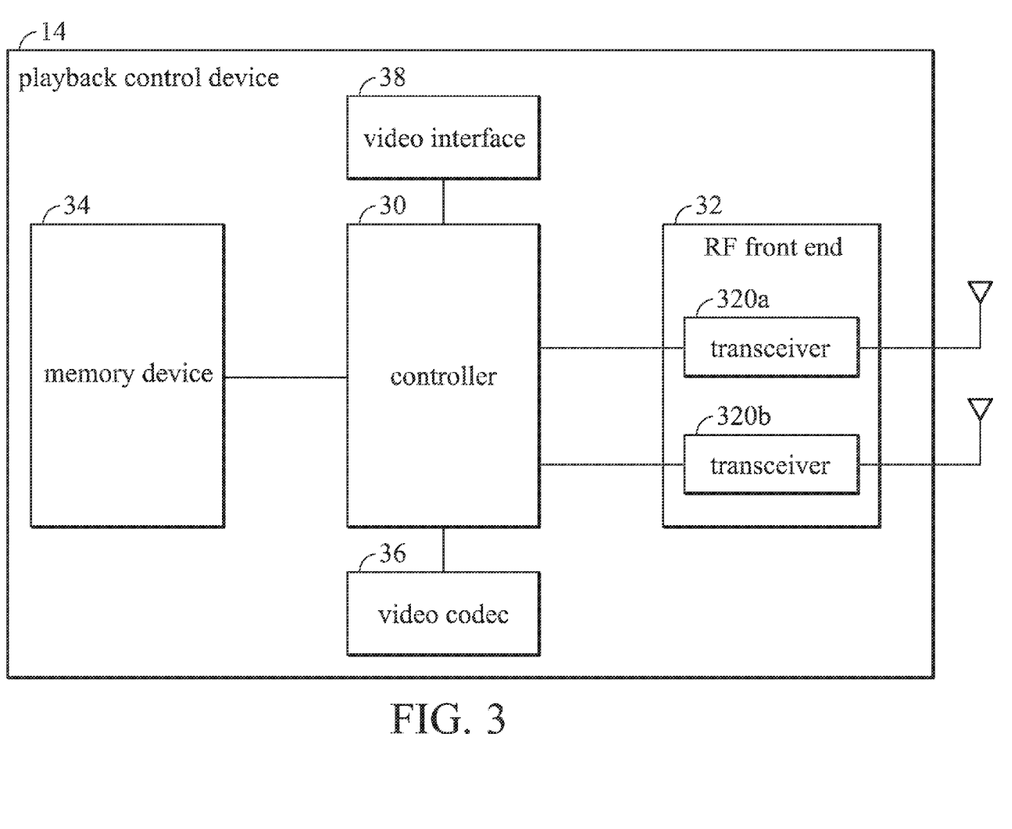
FIG. 3 is a block diagram of the playback control device 14 according to an embodiment of the invention.

FIG. 3 is a block diagram of the playback control device 14 according to an embodiment of the invention, comprising a controller 30, a RF front end 32, a memory device 34, a video codec 36 and a video interface 38. The controller 30 controls operations of the RF front end 32, the memory device 34, the video codec 36 and the video interface 38.

The controller 30 may allocate a memory space in the memory device 34 to install all incorporated software modules and execute the instructions of the installed software modules to detect and decode the multimedia data, perform the software arbitration when two or more types of the multimedia data request for playback based on the corresponding priorities, and permit the multimedia data with a higher priority to be played back on the display device 16. The incorporated software modules include the arbiter module 20, the display module 22, the communication module 24 and the video processing module 28 in the FIG. 2. The memory device 102 may include a volatile memory such as the Static Random Access Memory (SRAM) or Dynamic RAM (DRAM), or a non-volatile memory such as a hard disc or a flash memory.

The RF front end 32 contains transceivers 320a and 320b, of which one may receive the unencrypted wireless data while the other may receive the encrypted wireless multimedia data. In some embodiments, the transceiver 320a may correspond to receiving the unencrypted data such as PC2TV or UPnP data, and the transceiver 320b may correspond to receiving the encrypted data such as WiDi or WFD data. The controller 30 may install dedicated device drivers for controlling and interacting with the transceivers 320a and 320b to allocated memory spaces in the memory device 34, with the device driver for the transceiver 320b capable of decrypting and processing the received encrypted WiDi or WFD data, and the device driver for the transceiver 320a capable of processing the unencrypted WiFi or UPnP data. For example, the transceiver 320a may be controlled by the PC2TV or UPnP communication modules 240 and 242, and the transceiver 320b may be controlled by the WiDi or WFD communication modules 244 and 246.

In some implementations, the playback control device 14 deploys only one transceiver 320 in the RF front end 32 for retrieving the wireless multimedia data. The playback control device 14 is required to load different device drivers for the unencrypted data such as PC2TV or UPnP data and encrypted data such as WiDi or WFD data, as the former multimedia data types does not require decryption and the latter multimedia data types requires decryption.

The video codec 36 may be a Moving Picture Experts Group (MPEG) codec, encoding and decoding the videos or other multimedia files delivered by the DMR device. The video interface 38 may be used for transferring video data from the playback control device 14 to the display device 16.

The playback control device in the embodiment provides an arbitration mechanism to determine which of the requested playbacks has the access to a display device when two or more requests for multimedia playbacks by the display device are received by the playback control device, allowing for various types of multimedia data from portable computer devices to be viewed on a remote wireless display device.

Figure 4:
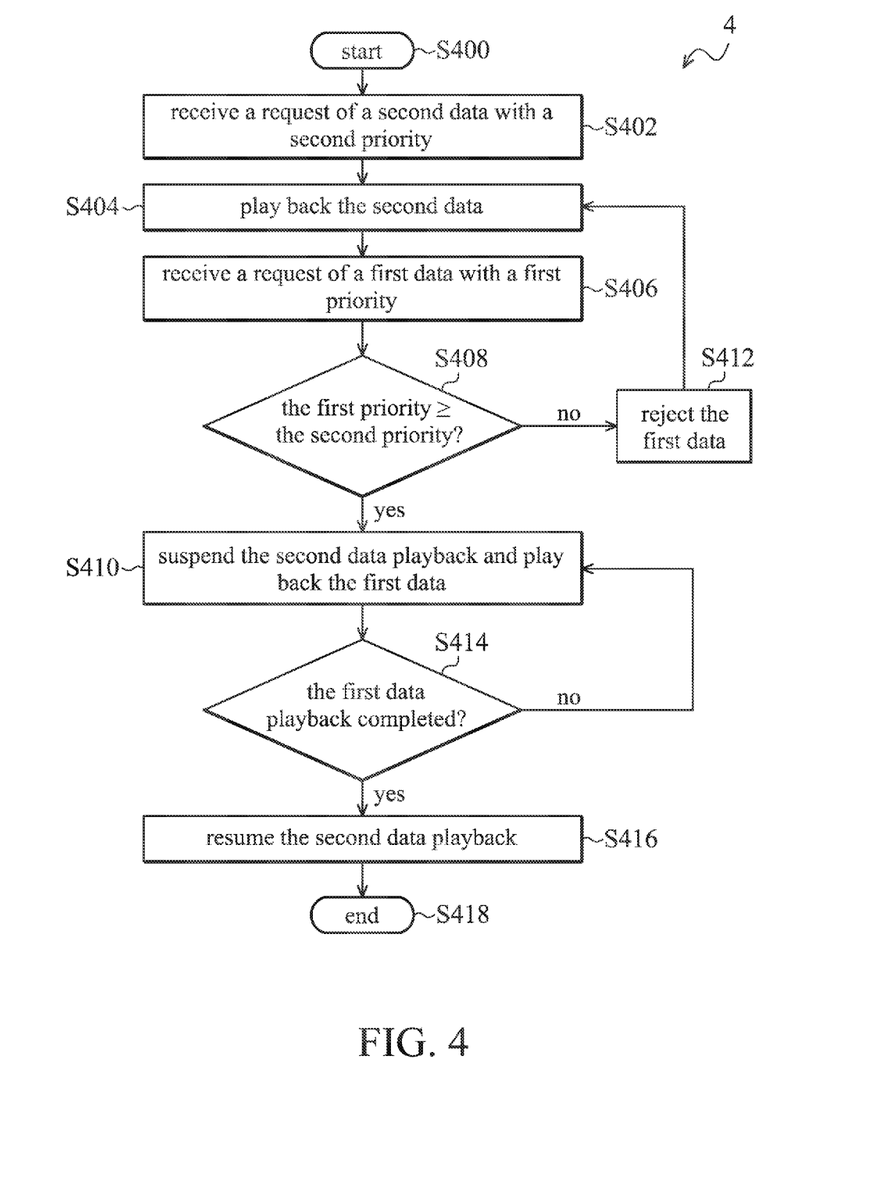
FIG. 4 is a flowchart of a wireless video arbiter method 4 according to an embodiment of the invention.

FIG. 4 is a flowchart of an arbiter method 4 according to an embodiment of the invention, adopted by the playback control device 14.

Upon startup, the controller 30 may configure priorities of all available multimedia data types and may install the device drivers for the transceivers 320a and 320b (S400). The available multimedia data types may include but are not limited to the PC2TV data, the DMR data, the WiDi data, and the WFD data. One of the transceivers 320a and 320b may decode the encrypted data and output the decrypted multimedia data to the corresponding display modules such as the WiDi module 224 or the WFD module 226, while the other transceiver may extract and transfer the unencrypted multimedia data to the corresponding display modules such as the PC2TV module 220 or the DMR module 222. Accordingly, the PC2TV display module 220, the DMR display module 222, the WiDi display module 224 and the WFD display module 226 may all detect the presence of the multimedia data thereof. Upon the data detection, the display module 22 may inform the arbiter module 20 of the presence of the multimedia data type. One of the display modules 220 through 226, herein the second requesting display module, may receive a second data of a second wireless multimedia data type having a second priority and send a playback request message REQUEST to the arbiter module 20 (S402). In response, the arbiter module 20 may send a grant message GRANT to the requesting display module to grant the second data of being played back on the display device 16 (S404). When two or more multimedia data types are present, the arbiter module 20 may arbitrate for which multimedia data type is to be played back on the display device 16 based on the priorities. While the display device 16 is displaying the second data, the arbiter module 20 may receive another playback request message REQUEST for a first data of a first wireless multimedia data type having a first priority from another one of the display modules 220 through 226, referred to as a first requesting display module (S406). In order to determine which of the first and second data should be played back, the arbiter module 20 may compare the priorities of the first and second multimedia data types by determining whether the first priority exceeds or equals to the second priority (S408). When the first priority exceeds or equals to the second priority, the arbiter module 20 may suspend or stop the ongoing second data playback by sending a release message RELEASE to the second requesting display module and play back the first data by sending a grant message GRANT to the first requesting display module (S410). When the first priority is less than the second priority, the arbiter module 20 may decline the playback request for the first data by sending a rejection message REJECT to the first requesting display module (S412) and continue playing back the second data (S404). The arbiter module 20 may regularly or continuously monitor whether the first data playback has been completed (S414), which may be done by regularly or continuously sending an ALIVE message from the video client device 12 to the playback control device 14 during the first data playback to indicate that playback is in progress. In some implementations, the arbiter module 20 may resume the suspended or stopped playback of the second data (S416), and only exits the arbiter method 4 when all the previously requested data playbacks are accomplished (S418). In other implementations, the arbiter method 4 is completed and exited after the first data playback is finished (S418).

The arbiter method 4 in the embodiment provides an arbitration mechanism to determine which of the requested playbacks has the access to a display device when two or more requests for multimedia playbacks by the display device are received, allowing for various types of multimedia data from portable computer devices to be viewed on a remote wireless display device.

Figure 5:
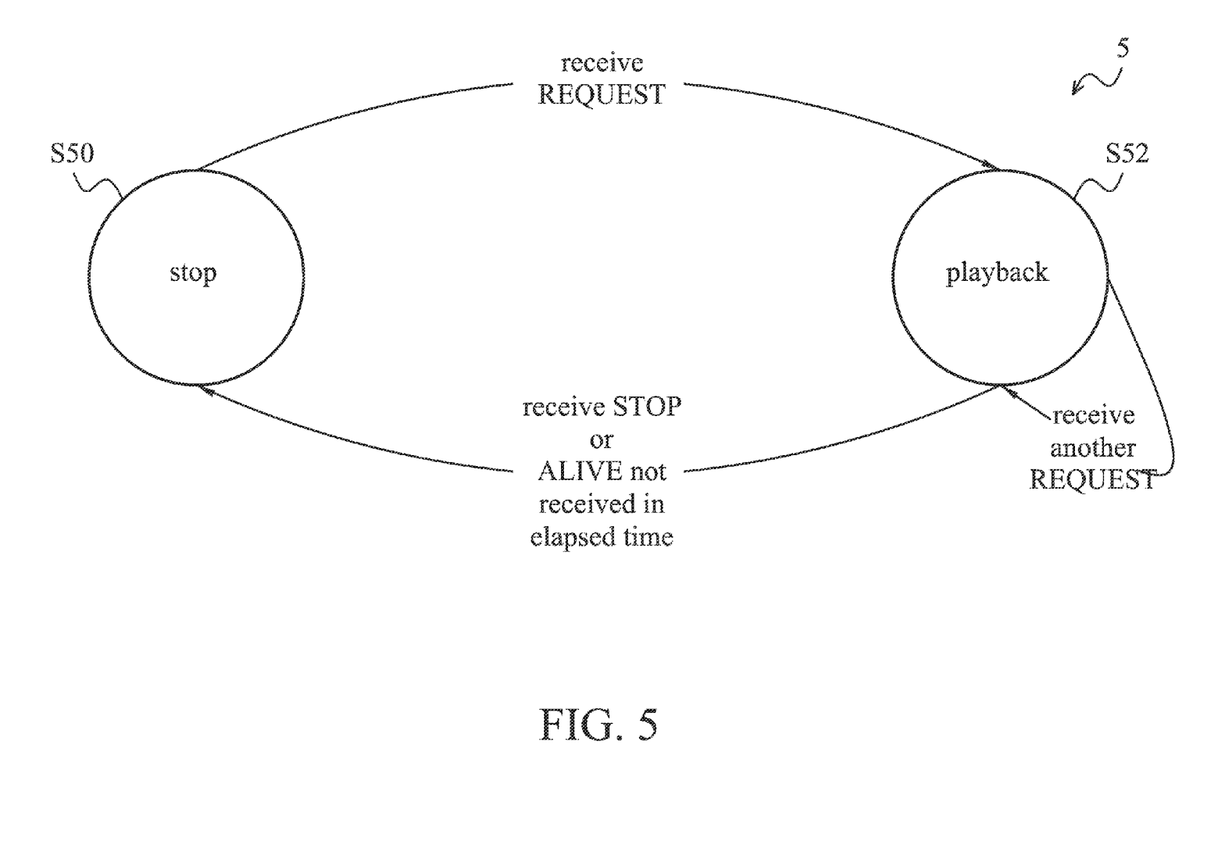
FIG. 5 illustrates a state machine for the playback control device 14 according to an embodiment of the invention.

FIG. 5 illustrates a state machine 5 for the playback control device 14 according to an embodiment of the invention.

The playback control device 14 may be at one of two possible states, i.e., a stop state S50 and a playback state S52. During initialization or an idle state, the playback control device 14 is at the stop state S50. Upon receiving a playback request message REQUEST from one of the video client devices 12, the playback control device 14 may move to the playback state S52. In the playback state S52, the playback control device 14 may grant the playback for the requested playback by sending a grant message GRANT. When the playback control device 14 receives another playback request message REQUEST from another video client device 12 during at the playback state S52, the playback control device 14 may determine which of the requested playbacks should be granted according to the priorities of the multimedia data types of the requested playbacks. The playback control device 14 may determine which of the requested playbacks has a higher or highest priority, and grant the requested playbacks having the higher or highest priority to take over the playback process by a grant message GRANT, while suspending or stopping the multimedia playback with a lower priority by a release message RELEASE. In some implementations, the playback control device 14 may carry on the suspended or stopped multimedia playback after the present playback process is completed, and return to the stop state S50 after all requested playbacks are accomplished. In another implementation, the playback control device 14 may return to the stop state S50 after the present playback process is completed without resuming the suspended or stopped multimedia playback. In yet another implementation, the playback control device 14 may go back to the stop state S50 by a stop message STOP from the video client device 12. In yet another implementation, the playback control device 14 may go back to the stop state S50 when the ALIVE message is not received from the video client device 12 after a predetermined time has elapsed.

The state machine 5 can be adopted for the arbitration mechanism detailed in FIG. 1 through FIG. 4, determining which of the requested playbacks has the access to a display device when two or more requests for multimedia playbacks by the display device are received, allowing for various types of multimedia data from portable computer devices to be viewed on a remote wireless display device.

Figure 6:
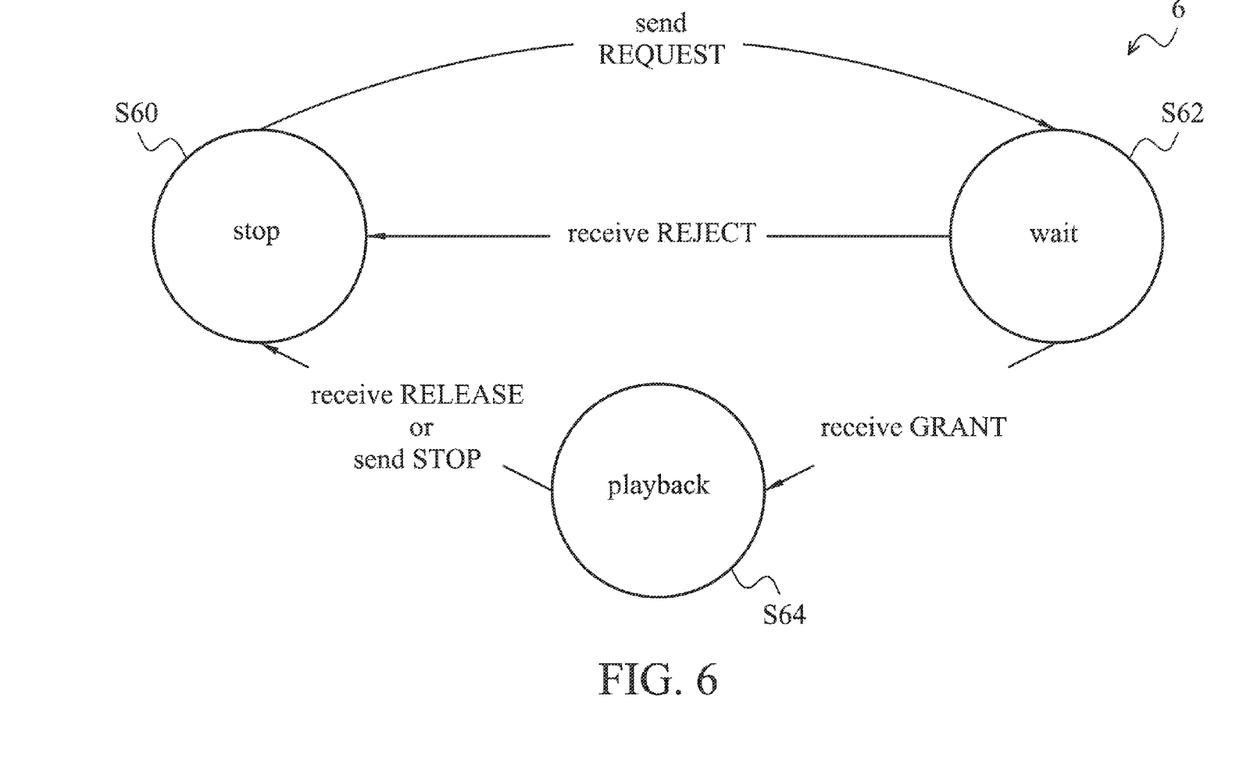
FIG. 6 illustrates a state machine for the video client device 12 according to an embodiment of the invention.

FIG. 6 illustrates a state machine 6 for the one of the video client device 12 according to an embodiment of the invention.

The video client device 12 may be at a stop state S60, a wait state S62 or a playback state S64. During initialization or an idle state, the video client device 12 is at the stop state S40. When receiving the multimedia data from the coupled computer, the video client device 12 may send a playback request message REQUEST for playing back the received multimedia data to the playback control device 14, and then enter into the wait state S62. In the wait state S62, the video client device 12 may receive a grant message GRANT or a rejection message REJECT from the playback control device 14. Upon receiving the grant message GRANT, the video client device 12 may enter the playback state S64 and transfer the multimedia data to the playback control device 14 using the designated wireless communication technology. During the data transmission, the video client device 12 may leave the playback state S64 and enter the stop state S60 when receiving a release message RELEASE from the playback control device 14 or a stop instruction from the coupled computer. When the rejection message REJECT is received, the video client device 12 may leave the wait state S62 and return to the stop state S60.

The state machine 6 may be incorporated in the arbitration mechanism detailed in FIG. 1 through FIG. 4, sending a request for a multimedia playback to a playback control device to acquire access to a remote wireless display device.

Figure 7:
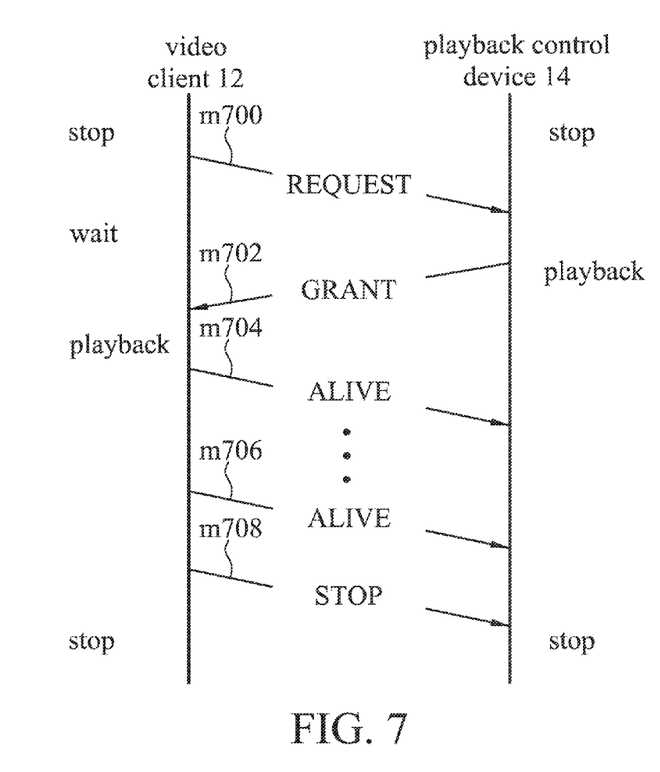
FIG. 7 is a message sequence chart of a video play procedure adopted by the wireless multimedia system 1 according to an embodiment of the invention.

FIG. 7 is a message sequence chart of a video play procedure adopted by the wireless multimedia system 1 according to an embodiment of the invention, incorporating the state machines 5 and 6 in FIGS. 5 and 6.

Upon startup, the video client device 12 is initiated at the stop state S60, and the playback control device 14 is initiated at the stop state S50. The video client device 12 may request for a video playback by sending a playback request message REQUEST to the remote playback control device 14 and move to the wait state S62 (m700). In response, the playback control device 14 may enter the playback state S52 and return a grant message GRANT to the video client device 12, granting the requested video playback (m702). In return, the video client device 12 may change to the playback state S64 and send the multimedia data. Continuous messages ALIVE are sent to the playback control device 14 (m704~m706) until the end of the multimedia data to indicate that playback is in progress. The video client device 12 may inform the playback control device 14 of the end of the multimedia data by issuing a stop message STOP to the playback control device 14, and then both the video client device 12 and the playback control device 14 may return to the stop states S60 and S50. Thus the video play procedure is completed and exited.

Figure 8:
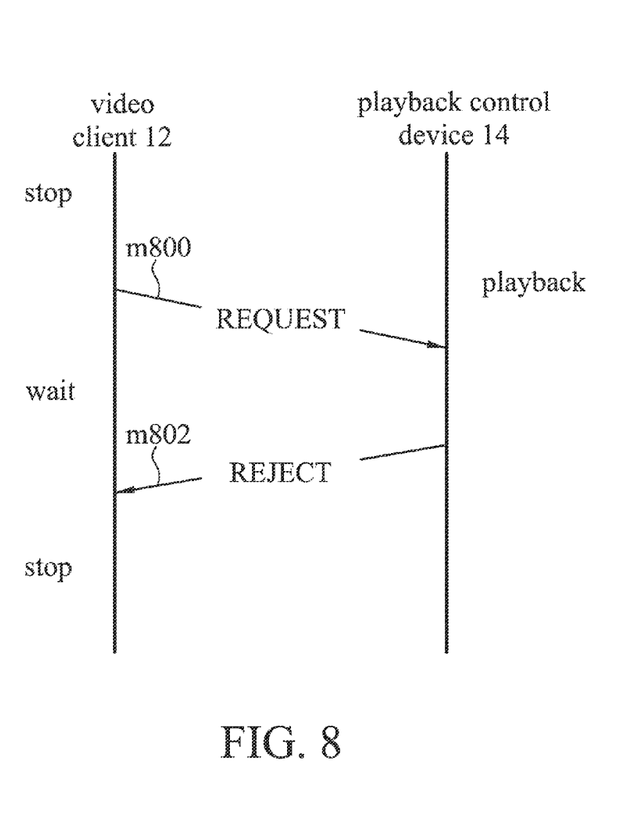
FIG. 8 is a message sequence chart of a request rejection procedure adopted by the wireless multimedia system 1 according to an embodiment of the invention.

FIG. 8 is a message sequence chart of a request rejection procedure adopted by the wireless multimedia system 1 according to an embodiment of the invention, incorporating the state machines 5 and 6 in FIGS. 5 and 6.

Upon startup, the video client device 12 is initiated at the stop state S60, and the playback control device 14 is in the playback state S52. The video client device 12 may request for a video playback by sending a playback request message REQUEST to the remote playback control device 14 and move to the wait state S62 (m800). In response, the playback control device 14 may return a rejection message REJECT to the video client device 12, rejecting the requested video playback due to the relatively higher priority of another video client device already acquiring the playback right (m802). In return, the video client device 12 may return to the stop state S60. Thus the video rejection procedure is completed and exited.

Figure 9:
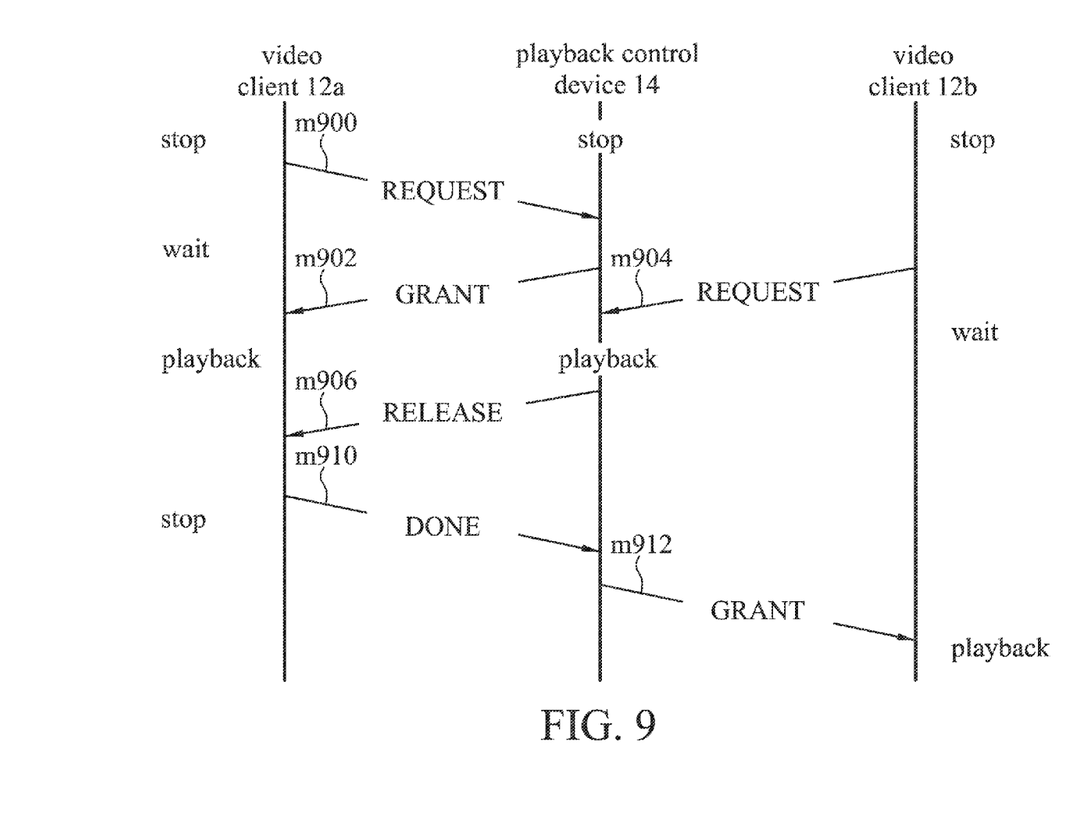
FIG. 9 is a message sequence chart of a preemptive play procedure adopted by the wireless multimedia system 1 according to an embodiment of the invention.

FIG. 9 is a message sequence chart of a preemptive play procedure adopted by the wireless multimedia system 1 according to an embodiment of the invention, incorporating the state machines 5 and 6 in FIGS. 5 and 6.

Upon startup, the first and second video client devices 12a, b are initiated at the stop state S60, and the playback control device 14 is initiated at the stop state S50. The first video client device 12a may request for a video playback by sending a playback request message REQUEST to the remote playback control device 14 and move to the wait state S62 (m900). In response, the playback control device 14 may enter the playback state S52 and return a grant message GRANT to the first video client device 12a, granting the requested video playback (m902). In return, the first video client device 12a may move to the playback state S64 and send the multimedia data to the playback control device 14. At some later point, the second video client device 12b initiates another playback request message REQUEST to the playback control device 14 and enters the wait state S62 (m904). The playback control device 14 has to arbitrate which of the requests should be granted of the playback right based on the priorities of the multimedia data types. The playback control device 14 may determine that the second video client device 12b has a higher priority, suspend the playback of the data from the first video client device 12a by a release message RELEASE (m906). As a consequence, the first video client device 12a may terminate the present multimedia playback by sending a completion message DONE to the playback control device 14 and return to the stop state S60 (m910). After receiving the completion message DONE, the playback control device 14 may determine the first playback has been successfully terminated and grant the second video client device 12b the playback right by a grant message GRANT (m912). In return, the second video client device 12b may send the multimedia data for the granted playback to the playback control device 14 (not shown), and the preemptive play procedure is completed and exited.

In summary, the present invention provides an arbitration mechanism for playback in various wireless display technologies. When multiple requests of playback of different multimedia data types from client devices are received by a playback control device of a remote wireless display device, the decision of whether to grant such requests is made by comparing their corresponding priorities. The priority may be assigned by default settings or be user-configured. The present invention thus allows for various types of concurrently sent multimedia data from portable devices to be viewed on a remote wireless display device in an orderly manner. In addition, by combining the communication modules and display modules of various wireless display technologies in one single playback control device, the wireless multimedia system may easily accommodate to new multimedia data types by installing the corresponding new communication modules and display modules into the playback control device.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, processor, microprocessor or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, performed by a playback control device, comprising:
   receiving a first request to playback a first data of a first wireless multimedia data type having a first priority from a first video client device;
   transmitting a first grant message to the first video client device to grant playback of the first data;
   playing back the first data on a display device coupled to the playback control device if no other data of a wireless multimedia data type having a priority higher than the first priority is received;
   receiving a second request to playback a second data of a second wireless multimedia data type having a second priority from a second video client device; and
   transmitting a release message to the first video client device to suspend the playing back the first data step if the second priority is higher than or equal to the first priority;
   wherein the first data is transmitted from the first video client device to the playback control device to be played back on the display device.

2. The method of claim 1, further comprising:
   receiving a second request for playing back a second data of a second wireless multimedia data type having a second priority from a second video client device; and
   transmitting a reject message to the second video client device to reject playback of the second data if the first priority is higher than the second priority.

3. The method of claim 1, further comprising:
   receiving a completion message from the first video client device to terminate playback of the first data.

4. The method of claim 1, further comprising:
transmitting a second grant message to the second video client device to grant playback of the second data; and
playing back the second data on the display device coupled to the playback control device;
wherein the second data is transmitted from the second video client device to the playback control device to be played back on the display device.

5. The method of claim 1, wherein the first wireless multimedia data type complies with one of a plurality of protocols comprising a Wireless Fidelity (WiFi) protocol, a Universal Plug and Play (UPnP) protocol, a Wireless Display (WiDi) protocol, and a WiFi Direct (WFD) protocol.

6. The method of claim 1, further comprising:
receiving an alive message from the first video client device regularly to indicate that playback is in progress.

7. A playback control device, comprising:
a front end, configured to receive a first request to playback a first data of a first wireless multimedia data type having a first priority from a first video client device; and
a controller, coupled to the front end, configured to process the first data for playback on a display device coupled to the playback control device if no other data of a wireless multimedia data type having a priority higher than the first priority is received;
wherein the playback control device transmits a first grant message to the first video client device to grant playback;
the first data is transmitted from the first video client device to the playback control device to be played back on the display device;
the front end is further configured to receive a second request to playback a second data of a second wireless multimedia data type having a second priority from a second video client device;
the controller is further configured to suspend the processing of the first data for the playback if the second priority is higher than or equal to the first priority; and
the controller is further configured to process the second data for playback;
wherein the playback control device transmits a release message to the first video client device to suspend playback of the first data.

8. The electronic device of claim 7, wherein:
the front end is further configured to receive a second request for playing back a second data of a second wireless multimedia data type having a second priority from a second video client device; and
the controller is further configured to reject the second request if the first priority is higher than the second priority;
wherein the playback control device transmits a reject message to the second video client device to reject playback of the second data.

9. The electronic device of claim 7, wherein:
the playback control device receives a completion message from the first video client device to terminate playback of the first data.

10. The electronic device of claim 7, wherein:
the playback control device transmits a second grant message to the second video client device to playback the second data;
wherein the second data is transmitted from the second video client device to the playback control device to be played back on the display device.

11. The electronic device of claim 7, wherein:
the front end comprises a first transceiver device and a second transceiver device, and wherein the first transceiver device corresponds to receiving encrypted wireless multimedia data and the second transceiver device corresponds to receiving unencrypted wireless multimedia data.

12. The electronic device of claim 7, wherein:
the front end comprises a transceiver device corresponding to receiving both encrypted and unencrypted wireless multimedia data.

13. The electronic device of claim 7, wherein the first wireless multimedia data type complies with one of a plurality of protocols comprising a Wireless Fidelity (WiFi) protocol, a Universal Plug and Play (UPnP) protocol, a Wireless Display (WiDi) protocol, and a WiFi Direct (WFD) protocol.

14. A method, performed by a video client device, comprising:
transmitting a first request message of a first wireless multimedia data type having a first priority to a playback control device to request playback of a first data;
receiving a first grant message from the playback control device to grant playback of the first data on a display device coupled to the playback control device if no other data of a wireless multimedia data type having a priority higher than the first priority is received by the playback control device;
transmitting the first data from the first video client device to the playback control device to be played back on the display device if the first grant message is received by the video client device; and
receiving a release message from the playback control device to suspend playback of the first data if a second request message of a second wireless multimedia data type having a second priority higher than the first priority is received by the playback control device from a second video client device to request playback of a second data;
wherein the second data is transmitted from the second video client device to the playback control device to be played back on the display device.

15. The method of claim 14, further comprising:
receiving a reject message from the playback control device to deny playback of the first data if other data of a wireless multimedia data type having a priority higher than the first priority is received by the playback control device.

16. The method of claim 14, further comprising
receiving a second grant message from the playback control device to resume playback of the first data after playback of the second data has been completed.

17. The method of claim 14, wherein the first wireless multimedia data type complies with one of a plurality of protocols comprising a Wireless Fidelity (WiFi) protocol, a Universal Plug and Play (UPnP) protocol, a Wireless Display (WiDi) protocol, and a WiFi Direct (WFD) protocol.

* * * * *